United States Patent [19]

Doukakis et al.

[11] 4,318,271
[45] Mar. 9, 1982

[54] IGNITER AND GAS GENERATOR FOR ROCKET MOTOR

[75] Inventors: Harry W. Doukakis, Wilmington; Robert E. Black, Jr., Newark, both of Del.

[73] Assignee: Thiokol Corporation, Newtown, Pa.

[21] Appl. No.: 112,032

[22] Filed: Jan. 14, 1980

[51] Int. Cl.³ .............................................. F02K 1/52
[52] U.S. Cl. ........................................ 60/232; 60/256
[58] Field of Search .......................... 60/232, 253–256; 239/265.35

[56] References Cited

U.S. PATENT DOCUMENTS

| | | | |
|---|---|---|---|
| 3,237,890 | 3/1966 | Thielman | 60/232 |
| 3,912,172 | 10/1975 | Bolner | 239/265.35 |
| 4,047,667 | 9/1977 | McCullough et al. | 239/265.35 |

Primary Examiner—Robert E. Garrett
Attorney, Agent, or Firm—Gerald K. White; William R. Wright, Jr.; Thomas W. Brennan

[57] ABSTRACT

A rocket motor equipped with a movable nozzle is provided with pneumatic pressure system for the operation of the mechanism for moving the nozzle with a gas for the pneumatic supplied from a gas generating propellant separate from the main propellant but located within the motor itself.

11 Claims, 3 Drawing Figures

FIG. I

IGNITER AND GAS GENERATOR FOR ROCKET MOTOR

The invention herein described was made in the course of or under a contract with the United States amended by the U.S. Department of the Navy.

BACKGROUND OF THE INVENTION AND DISCUSSION OF THE PRIOR ART

Rocket motors are often equipped with outlet nozzles which are movable so that their longitudinal axes can be directed angularly with respect to the longitudinal axis of the motor so that the thrust exerted by the passage of combustion gases from the motor can be directed for the purpose of steering the vehicle to which the motor is attached. The nozzle is mounted on a swivel or ball joint at the nozzle throat so that it can be moved universally by the application of forces upon it created by mechanical or hydraulic means under the influence of a control system. Such an arrangement is shown in U.S. Pat. No. 3,049,877 to Arthur Sherman, particularly in FIG. 2 thereof, wherein hydraulic struts are externally connected mechanically to the nozzle of the motor and cause it to be moved universally (within its mechanical limits) as pressurized hydraulic fluid is valved to the struts through a controlled spool valve.

Another U.S. Pat. No. 3,912,172 to Thomas Bolner utilizes the internal structure of the nozzle's ball joint, at the juncture of the nozzle to the rocket motor's combustion chamber, to provide an internal means for moving the nozzle, and, it is this latter arrangement for which the present invention provides a pneumatic pressurized gas source instead of a hydraulic liquid system.

The present invention is concerned with the provision of a simple, compact, lightweight, reliable and positive source and supply system for a pressurized gas wherein a gas generant is burned in the system and is supplied to the actuating means. In addition, the pneumatic gas generating system is combined into a single structural unit with the ignition system of the rocket motor and is within the rocket motor thus producing a saving in weight and space requirements, both of which are important considerations in flight hardware such as rocket motors.

The provision of a pneumatic system in the present invention is advantageous over the previously used liquid hydraulic system in that the gas cannot freeze, congeal or change significantly with high altitude or space conditions as could be the case with some fluids. Also, if a leak should occur, the gas will pass harmlessly out of the system whereas hydraulic liquids might leak onto other components and cause corrosion, possible corrosion, create a fire hazard or cause electrical short circuits.

OBJECTS OF THE INVENTION

It is, therefore, an object of the invention to provide an improved system for the operation of a vectorable nozzle of a steerable rocket motor wherein the operating fluid is pneumatic.

It is also an object of the present invention to provide a system of the foregoing type wherein the operating fluid is a combustion gas.

It is also an object of the present invention to provide a system of the foregoing type wherein the operating fluid is a combustion gas supplied by a gas generant.

It is also an object of the present invention to provide a system of the foregoing type wherein the gas generant is located within the rocket motor.

It is also an object of the present invention to provide a system of the foregoing type wherein the gas generator is located in a common housing with the rocket motor's igniter and both are located within the rocket motor.

Other objects and advantages of the present invention will become apparent from the descriptions of the device and of its operation which follow.

THE DRAWINGS

DETAILED DESCRIPTION OF THE INVENTION

Figure 1:
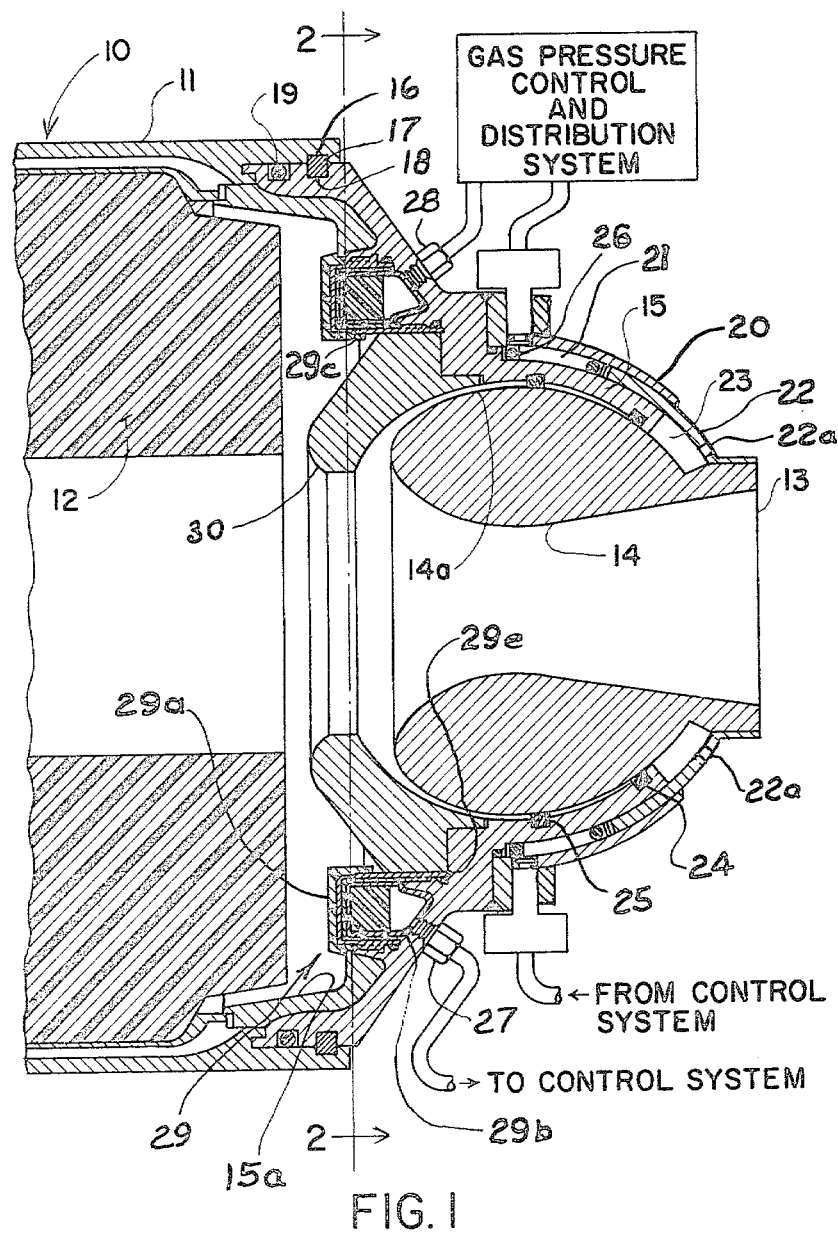
FIG. 1 is a cross sectional view of the rocket motor and its steerable nozzle taken on line 1—1 of FIG. 2 and showing the gas generator and its system connecting it to the nozzle.

In a preferred embodiment of the invention, and with reference particularly to FIG. 1 of the drawings, a rocket motor 10 is shown having an outer casing 11 closed at its head end (not shown) and containing a solid propellant 12. The casing 11 has an assembly located at its after end (right hand end in FIG. 1) to receive and retain an exhaust nozzle 13 by means of a sliding ball joint connection comprising a central annular throat 14 having a substantially spherically-shaped outer retaining surface 14a and a mating spherically surfaced outer member or shell 15 partially covering surface 14a as shown. Shell 15 extends inwardly toward motor casing 11 (to the left in FIG. 1) and is connected to casing 11 about its inner periphery by means of retaining ring 16 which fits in corresponding grooves 17 and 18 in casing 11 and shell 15, respectively, and prevents separation of the two members. An O-ring seal 19 is provided between casing 11 and shell 15 to prevent leakage of combustion bases from the motor at this joint.

An outer shell member 20 is attached to member 15 in the manner shown in FIG. 1 and is arranged to provide a gap or chamber 21 therebetween which is annular in shape in one dimension and curved in its other dimension so as to conform to the semi-spherical shape of member 15. An additional shell or member 22 is fixedly attached to the outer end of nozzle 13 and extends into gap 21 about one-half of its length with nozzle 13 in a straight ahead attitude. Shell 22 is formed into a spherical shape on each of its sides to match the spherical surfaces of members 15 and 20 where they are adjacent the gap 21 and is slidable in gap 21. A clearance space 23, vented to atmospheric conditions or to space conditions by means of vent holes 22a is provided between the right hand end of shell 15 and nozzle 14 to permit movement of nozzle 13. Seals 24 and 25 are included in grooves on the inside surface of member 15 to prevent hot gases from the rocket motor's combustion chamber from passing between surface 15a of nozzle 13 and member 15 and to act as a smooth surface upon which the nozzle 13 can be moved relatively easily.

As mentioned previously in this specification, a gap 21 is provided and this gap contains four seals 26 which are closed elongated loop seals set in the gap and spaced 90 degrees apart about the circumference of nozzle 13. Such an arrangement of loop seals 26 is known in the art and is described in the patent to Thomas Bolner (U.S. Pat. No. 3,912,172) mentioned earlier in this specification.

An annular or toroidal ring assembly 29 is located within the rocket motor at its after end as shown where it encircles the nozzle 13 and its annular frontal piece 30 in the manner shown in FIG. 1. As will be seen, the location of the ring assembly 29 is out of the main flow of combustion gases to some extent and does not interfere with the normal flow into and through throat 14 of the nozzle 13.

The ring assembly 29 is comprised of members 29a, 29b, 29c, 29d and 29e. Annulus 29a serves as a protection from the rocket blast and is made of silica-filled rubber. It is open at its right hand side in FIG. 1 to accomodate annular metal ring 29e which is also open on its right hand side in FIG. 1 and is provided with external threads which mate with matching threads on member 15 to form an enclosure upon assembly. Before assembly, however, an inhibiting and insulating barrier member 29c is inserted in ring 29e with its right hand side in FIG. 1 open to receive igniter-generator retainer or "doughnut" 29b which is placed therein in the manner shown with member 29c between ring 29d and retainer 29b. Retainer 29b is made of a hard plastic material and contains arcuate, alternate segments of gas generator propellant and igniter propellant as discussed below. The entire assembly 29 is then screwed in place on member 15 as shown in FIG. 1.

Figure 2:
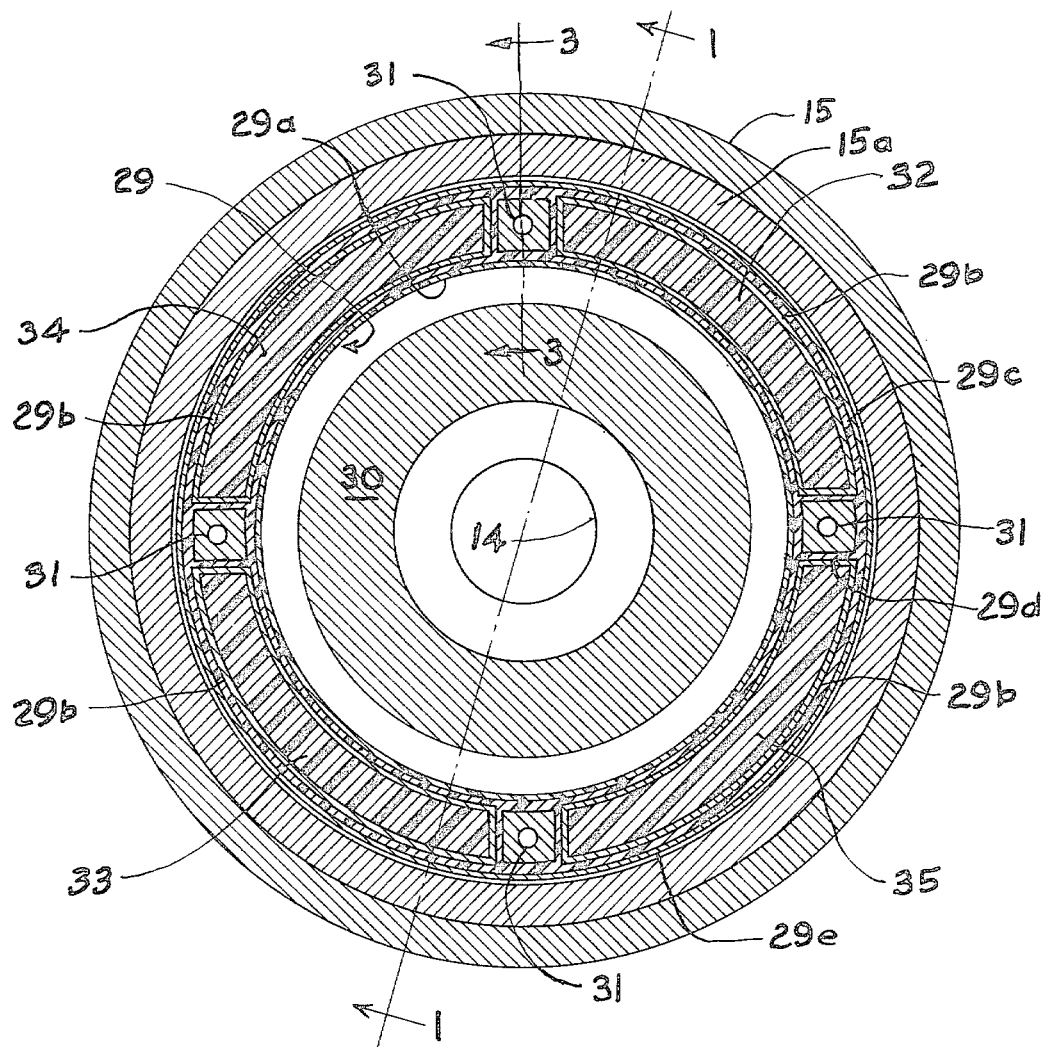
FIG. 2 is a transverse cross sectional view of the rocket motor taken on line 2—2 of FIG. 1 and looking in the direction of the rocket's nozzle.
Figure 3:
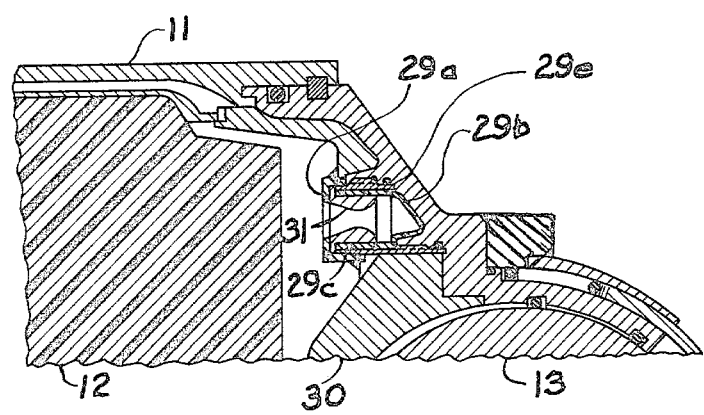
FIG. 3 is a cross sectional partial view taken on line 3—3 of FIG. 2 looking in the direction of the arrows.

Also, member 29c includes divider walls 29d as integral parts which also serve as inhibiting and insulating barriers. As will be seen in FIG. 2, nozzle outlets 31 are fitted between these walls 29d with the nozzle outlets 31 open to the combustion chamber of the motor adjacent the solid propellant as shown in FIG. 3. Also with reference to FIG. 2, the curved retainers 29b are closed at their ends to form complete enclosures except as described later in connection with the igniter system.

Within each of retainers 29b is a combustible charge of propellant material. Two of these charges, 32 and 33, are of a gas generating composition and the other two, 34 and 35, are of a composition suitable to burn hot enough to cause ignition of the motor's main propellant. Such materials are well known in the art for ignition purposes and for supplying the gas for gas operated devices. The charges 32 and 33, which can also be referred to as gas generator segments, are completely contained in a gastight manner in a retainer 29b but have outlets such as shown at fittings 27 and 28 which lead through suitable pipes or conduit passages to a suitable gas pressure control and distribution system as shown in FIG. 1 from which the gas is distributed to, or bled from, the loop seals 25 to operate the movable nozzle 13.

The igniter segments 34 and 35, on the other hand, are each in communication with the nozzle outlets 31 at each of their respective ends.

OPERATION OF THE INVENTION

In order to set the rocket motor 10 in operation, the igniter segments 34 and 35 are ignited by means of a conventional electrical ignition system (not shown). As these burn, the hot gases and flame produced by their combustion exit through nozzles 31 and impinge upon the rocket motor's solid propellant 12 and it becomes ignited and produces large quantities of combustion gases which then pass out of the rocket motor 10 through nozzle 14 and produce thrust directed along the central axis of the symmetrical nozzle 14.

The thrust produced can, however, be directed in directions other than axial of the motor by moving to vector the nozzle in a rotary manner about its ball joint, thus producing a steering effect for the motor 10. As mentioned previously in this specification, this is accomplished in the present invention by the application of pneumatic pressure generated by the combustion of the gas generator compound contained in generator segments 32 and 33. These gas generators are also ignited by the same conventional electrical means at the same time as ignition of the igniter segments 34 and 35 takes place. As they burn, the gas generated by their combustion is carried through outlets 27 and 28 to the conventional gas pressure control and distribution system and thence to the interior of loop seals 26 to move the nozzle in accordance with the program established by the control system. The loop seal 26 area opposite the pressurized loop seal is bled of pressurized gas by the control system to reduce its resistance to movement of the nozzle 13.

When the pressure in the main chamber rises to a level of approximately one half of the igniter-generator, the motor pressure influences the igniter-generator pressure and changes the igniter-generator flow to the motor from supersonic to subsonic.

When the igniter grains burn out and only the generator grain remains active, the pressure ratio (igniter-generator/motor) falls at this point to nearly unity; i.e., the igniter-generator pressure is only slightly higher than the motor. The generator grains however continue to produce warm gas for actuation. The generator grains also provide excess gas (more than required for the nozzle actuation) which is vented into the motor chamber to isolate, by preventing back flow, the actuation system from the relatively "dirty" exhaust products of the motor propellant, which, if used directly, would contaminate and overheat the warm gas pressure controlled distribution system.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore to be limited only as indicated by the scope of the following claims.

We claim:

1. A rocket motor comprising an outer casing defining a combustion chamber, propulsion gas producing means in said chamber, thrust producing means including a vectorable nozzle attached to said casing and communicating with said chamber; and, means for vectoring said nozzle including a combustible gas generant located in said motor between said nozzle and said propulsion gas producing means, combustion of said gas generant providing gaseous operating fluid for effecting vectoring of said nozzle and steering of said rocket motor.

2. The invention set forth in claim 1 wherein said gas generant is located adjacent said nozzle.

3. The invention set forth in claim 1 wherein the propulsion gas producing means is a solid propellant charge and said gas generant is located between said solid propellant charge and said nozzle.

4. The invention set forth in claim 3 with the gas generant enclosed in an annular housing.

5. The invention set forth in claim 4 with the annular housing attached to a fixed portion of the nozzle.

6. The invention set forth in claim 4 wherein the annular housing further includes an igniter for the solid propellant.

7. The invention set forth in claim 6 further including a combustible charge for said igniter in said annular housing, an outlet for the combustion products of said igniter charge, said outlet directed toward said solid propellant, an outlet for the products of combustion of said gas generant, and ignition means for said igniter charge and said gas generant.

8. The invention set forth in claim 7 wherein said outlet for the products of combustion of said gas generant connected to a nozzle actuator system.

9. A gas generator and igniter for a solid propellant rocket motor having a combustion chamber containing the propellant and a gas-operated vectorable nozzle in communication with said combustion chamber, the gas generator and igniter comprising an enclosed annular chamber located within the combustion chamber containing at least one gas generating grain and at least one igniter grain, an outlet for each grain in communication with both the chamber and the combustion chamber, and means for causing ignition of each of said grains, whereby ignition of the motor's propellant occurs and gas is generated for pneumatic operation of the gas-operated nozzle.

10. A gas generator for supplying gas to a pneumatic system for actuating a vectorable nozzle of a rocket motor associated therewith, an internal housing in said rocket motor at least a portion of which provides a housing for said gas generator, and an igniter charge for said motor in said housing provided for said gas generator.

11. The invention set forth in claim 10 wherein the gas output of the generator is in excess of the gas required to actuate the nozzle, whereby back flow from said rocket motor is prevented.

* * * * *